Jan. 5, 1960   G. D. SCHNEIDER ET AL   2,919,731
SLICING MACHINE
Filed Sept. 14, 1956   4 Sheets-Sheet 1

INVENTORS
GILBERT D. SCHNEIDER,
PAUL J. GEPFERT,
EUGENE L. MACKEY AND
BY   JACK C. SIEGRIST
ATTORNEYS

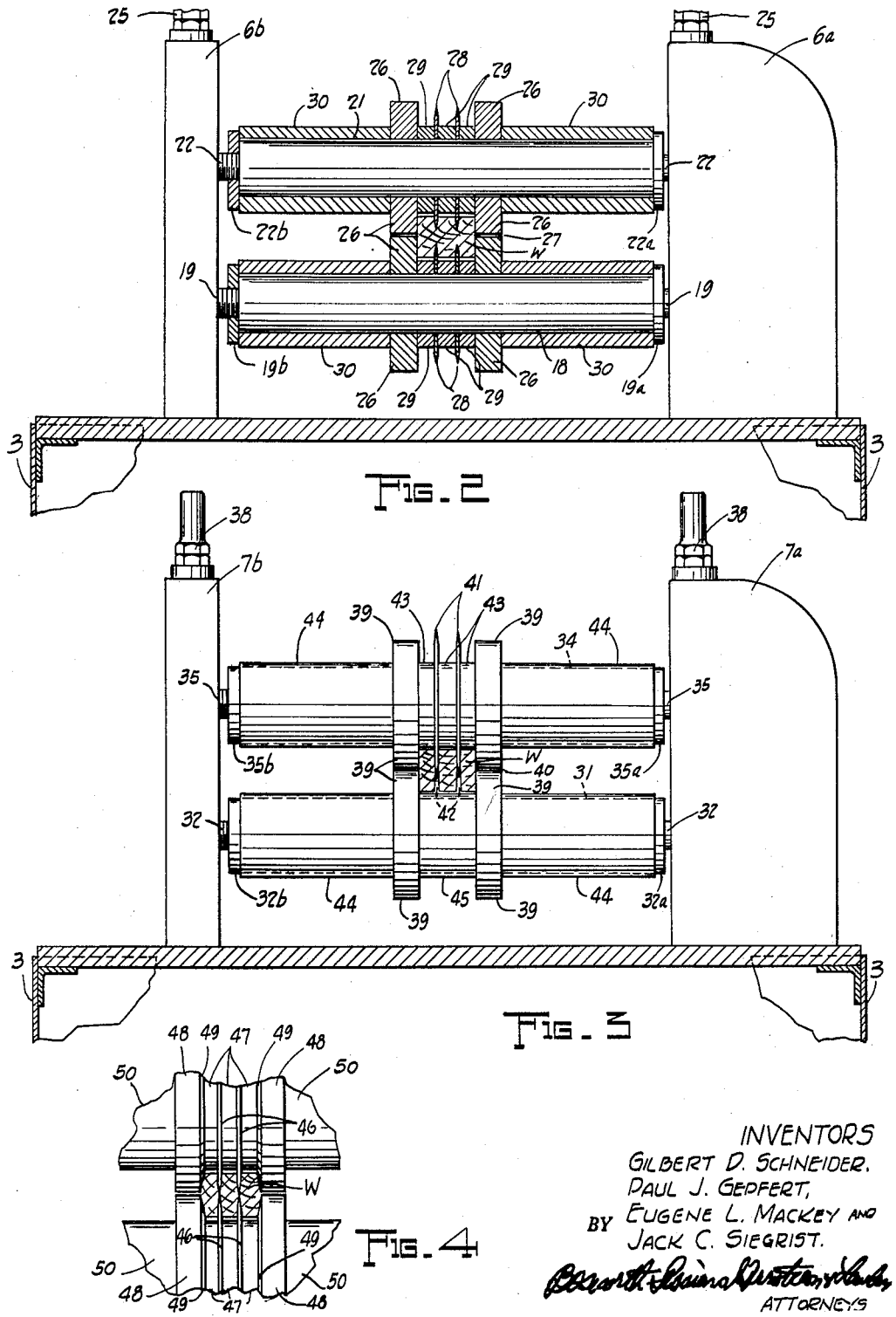

Jan. 5, 1960 G. D. SCHNEIDER ET AL 2,919,731
SLICING MACHINE
Filed Sept. 14, 1956 4 Sheets-Sheet 3

INVENTORS
GILBERT D. SCHNEIDER,
PAUL J. GEPFERT,
BY EUGENE L. MACKEY AND
JACK C. SIEGRIST

ATTORNEYS

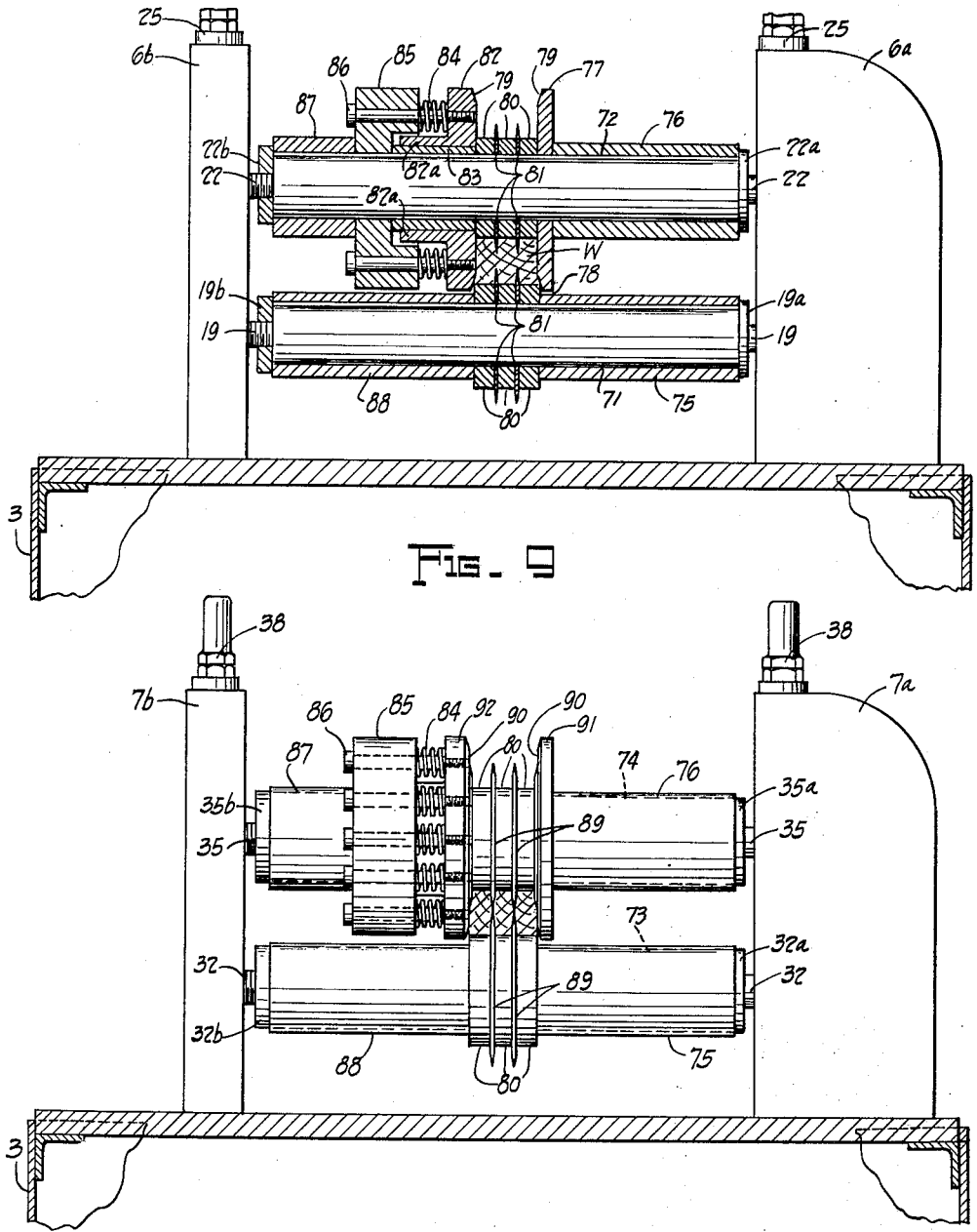

United States Patent Office 2,919,731
Patented Jan. 5, 1960

2,919,731

SLICING MACHINE

Gilbert D. Schneider, Lexington, Paul J. Gepfert, Cleveland, Eugene L. Mackey, Fairview Park, and Jack C. Siegrist, Bay Village, Ohio, assignors to Schneider Machine Co., Lexington, Ohio, a corporation of Ohio Application September 14, 1956, Serial No. 609,837

6 Claims. (Cl. 144—162)

This invention relates to a slicing machine of the type in which lumber is severed into lesser pieces by means of power-driven knives arranged in pairs with the lumber passing between them.

In slicing machines of this type, the problem of how to guide lumber through the machine sometimes presents practical difficulties. If, for example, the lumber is relatively long, as when it takes the form of an elongated block measuring several feet in length, even slight lateral displacement of the trailing end of the block can produce troublesome misalignment in the zone in which the knives must cut their way into the lumber. In the past, spring-pressed plates have sometimes been used to guide the lumber to, from and in the cutting zone. While such plates do tend to keep the lumber in the intended path of travel, the presence of the springs introduces so much flexibility into the guiding system that the results, while satisfactory in many other respects, have not always been regarded as sufficiently uniform as measured by the highest commercial standards.

The present invention, which dispenses with spring-pressed plates of this kind, has for one of its objects to obviate these and related difficulties. This it does by using throat-forming means of a size and shape such as to accommodate the lumber without undue clearance. Such throat-forming means are preferably made up of parts which, although characterized by rotary movement, do not permit the shape of the throat to change unless the machine is designed to accommodate lumber of random width. In one of its simplest forms, the invention makes use of a plurality of side-guiding collars on the shafts on which the knives are mounted, such collars flanking both the knives and the lumber. By virtue of the throat which they form with the shafts and of the rotary movement of the collars themselves, lateral forces are exerted on the lumber which keep it from deviating from the intended path of travel.

A further object of the invention is to equalize the side pressures on the lumber as it is being cut by the knives, to which end the invention contemplates reproducing on the collars the half-profiles of the knives.

Still a further object of the invention is to provide a simple, sturdy machine having a minimum number of cutting stations. By providing throats of the kind mentioned and driving the shafts on which the knives are mounted from an electric motor which has no other function than to supply power to the shafts, the number of cutting stations may be reduced to a minimum, sometimes to a single station. If there is more than one cutting station, the number of knives at the last station may sometimes be reduced by half by omitting the opposing knife or knives. Feed rolls, although sometimes helpful, can usually be omitted entirely, thus further simplifying the machine. The net result of all of these factors is to provide a wood-slicing machine which, although sturdy, is nevertheless of extremely simple construction.

Other objects, advantages and features of the invention will be apparent from the description which follows and from the accompanying drawings, in which:

Figure 2 is a section with parts in elevation through the roll stand at station A, the sectioned parts being seen as if from line 2—2 of Figure 1;

Figure 3 is a generally similar view of the roll stand at station B but with only the work itself shown in section;

Figure 4 is a fragmentary view of a modification of what is shown in Figures 2 and 3;

Figures 9 and 10 are views similar to those of Figures 2 and 3 illustrating still another form which the invention may take.

Figure 1:
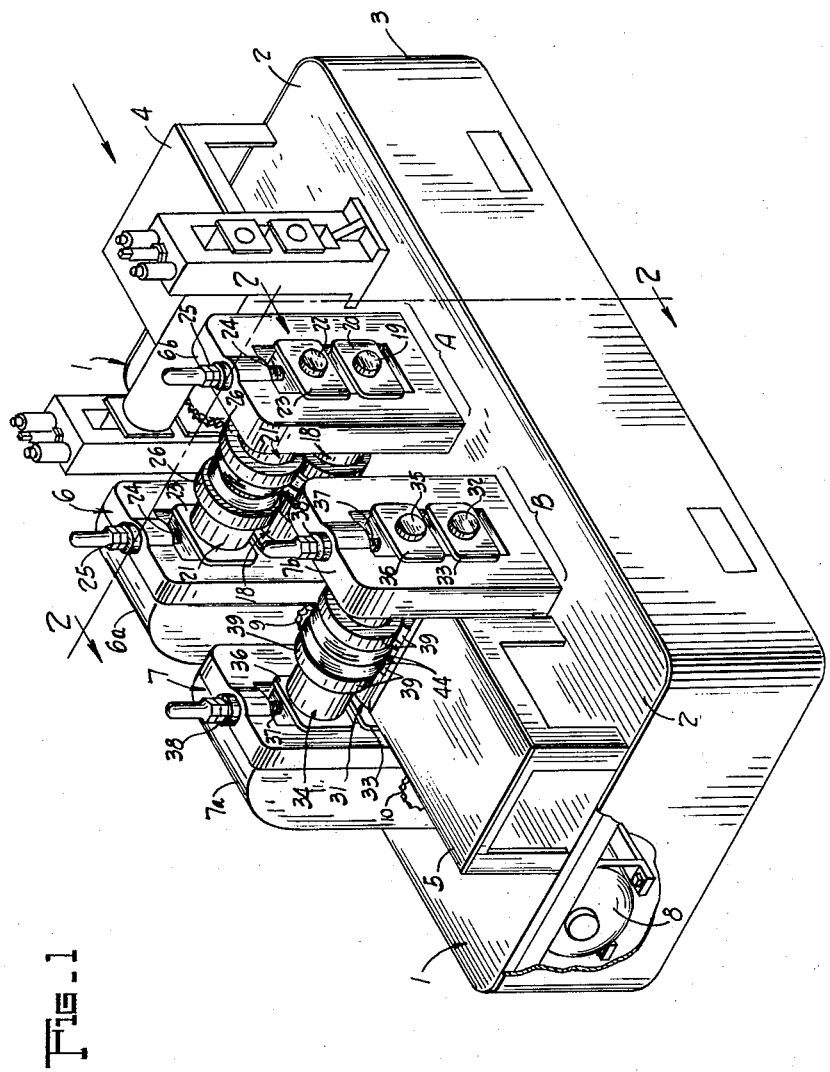
Figure 1 is an isometric view of a wood slicing machine conforming to one of the preferred forms of the invention.

The wood slicing machine shown in Figure 1, generally designated 1, includes a platform 2, a frame work (not shown) with corner posts, and, between them, panels 3. At the entry end of the machine is a feed table 4; at the discharge end, a runoff table 5. Between them are two roll stands 6 and 7 and, if desired, also a stand incorporating a set of feed rolls. The rolls in roll stands 6 and 7 and the feed rolls, if such are used, are driven from an electric motor 8 by means of a multiple chain drive, not shown in detail, which passes over sprockets 9 and 10. Motor 8 has no other function in the organization as a whole.

Roll stands 6 and 7 are generally similar but differ in respects more fully brought out hereinafter. Roll stand 6 includes two roll-supporting end frames 6a and 6b, best seen in Figure 2, the former of which houses conventional mechanism for driving the rolls. Roll stand 7 includes two roll-supporting end frames 7a and 7b, best seen in Figure 3, of which frame 7a houses the means for driving the rolls. Roll stand 6 is designated station A in Figure 1; roll stand 7, station B.

Referring to Figure 2, which shows the arrangement of parts at station A, it will be noted that the lower roll, indicated generally at 18, embodies shaft 19 the end portions of which extend into frames 6a and 6b. These portions of shaft 19, constituting the roll necks, are received in two conventional bearing blocks 20, one at each end of the shaft: see Figure 1. Overlying lower roll 18 is an upper roll, indicated generally at 21, embodying a shaft 22 the end portions of which project into two similar bearing blocks 23. By means of conventional screw shafts 24, provided at their upper ends with adjusting means 25, upper roll 21 may be moved toward or from lower roll 18.

On each of the two rolls are two like annular collars 26. On lower roll 19, the two collars 26 are spaced from each other by a predetermined amount; on upper roll 21, the two collars 26 are spaced from each other by the same amount. All four collars are of the same dimensions. All are rigidly mounted on the shafts forming part of the rolls. Thus the collars on lower roll 18 are or at least may be considered as opposed by the collars on upper roll 21.

Inasmuch as collars 26 are all of the same diameter, they may impinge on each other if, as will usually be the case, the rolls are driven at the same angular speed. Although not so shown, the collars may, if desired, be provided with intermeshing teeth; if so, upper roll 21 may be driven in this fashion from lower roll 18. In the embodiment of the invention illustrated in Figures 1, 2 and 3, there is a small clearance 27 between opposing collars, preferably of the order of a very few thousandths of an inch. This clearance, which helps prevent scoring of the collars, is shown in exaggerated fashion in Figures 2 and 3.

Rigidly mounted between the two collars 26 on lower roll 18 are two circular knives 28 the diameter of which is somewhat less than that of collars 26 but somewhat greater than that of the roll itself. Knives 28 on lower roll 18 are opposed by two similar knives 28 on upper roll 21. All four knives are of the same diameter. Although smaller in diameter than collars 26, all four knives 28 project into the throat defined by lower roll 18, upper roll 21 and collars 26. Through this throat is passed the lumber that is to be sliced, the same taking the form of an elongated block W.

In the embodiment of the invention shown in Figures 1, 2 and 3, this throat may be assumed to measure 2" in height and 3" in width and to accommodate a block of lumber measuring slightly less in transverse cross section. Each of the four knives 28 may be assumed to project ¾" into the throat, leaving a space between opposing knives measuring ½". Thus when rolls 18 and 21 are rotated, knives 28 form kerfs measuring approximately ¾" in depth in the top and bottom faces of block W. It will be noted that block W, although fitting snugly against collars 26, does not necessarily come into contact with the cylindrical surfaces of rolls 18 and 21 at station A, there being permissible clearances above and below the block W. These clearances appear in somewhat exaggerated fashion.

Between collars 26 and knives 28 are annular spacers 29 of like size and shape. On each roll two such spacers intervene between collars 26 and knives 28, while a third intervenes between the two knives 28. Two sleeves 30, one on each side of each pair of collars, serve to hold the collars, knives and spacers in proper position. Those sleeves 30 which adjoin frame 6a abut against integral flanges 19a and 22a on shafts 19 and 20, respectively; those which adjoin frame 6b abut against tapped nuts 19b and 22b at the opposite ends of the same shafts. Nuts 19b and 22b are threaded onto correspondingly threaded portions of the respective shafts. After nuts 19b and 22b have been tightened in place, the parts which intervene between them and flanges 19a and 19b are held rigidly in place on the shaft.

At station B, the lower roll, indicated generally at 31, embodies a shaft 32 the end portions of which extend into bearing blocks 33 in frames 7a and 7b. Above it is a similar roll, indicated generally at 34, embodying a shaft 35 the end portions of which extend into like bearing blocks 36 that are positioned directly above bearing blocks 33. The relationship between the two rolls is determined by screw shafts 37 of which there is one at each end of roll stand 7. The position of upper roll 34 may be adjusted by adjusting means 38. Lower roll 31 in roll stand 7 is positioned at the same level as lower roll 18 in roll stand 6; upper roll 34, at the same level as upper roll 21.

Mounted on shafts 32 and 35 are identical collars 39, there being one pair of collars 39 for lower roll 31 and a like pair for upper roll 34. As in the case of collars 26, collars 39 may or may not make contact with each other in a given case, although a clearance 40 of the order of a few thousandths of an inch is illustrated in Figure 3 as present where they approach each other. With rolls 31 and 34, collars 39 form a throat similar to that at station A.

Between the two collars 39 on upper roll 34 are two circular knives 41 which operate on block W. Knives 41 are unopposed by like knives on lower roll 31, having for their purpose in this embodiment of the invention only to complete the cuts that have been made at station A. They should, therefore, be of a diameter sufficiently great to permit them to reach downward into the kerfs 42 formed by the lower pair of knives 28. If, as assumed, knives 28 form kerfs ¾" deep, knives 41 should be capable of penetrating at least 1¼" into the wood, thus completing or virtually completing the severing step. It will be noted that at station B the clearances above and below block W are reduced in size as compared with the clearances at station A.

Spacers 43 similar to spacers 29 at station A are used on upper roll 34. On the same roll, sleeves 44 similar to sleeves 30 intervene between collars 39 and flange 35a at one end of the roll and nut 35b at the other end. Lower roll 31 is similarly formed except that it lacks knives 41 and spacers 43, having instead a long central spacer 45 which extends from the collar 39 on the left of the spacer to the like collar 39 on the right. Collars 39, sleeves 44 and spacer 45 intervene between flange 32a and nut 32b on shaft 32, the nut 32b serving to take up any spaces between the elements separating the flange 32a and the nut 32b. It is not necessary that there be knives on lower roll 31; it being sufficient at station B if knives 41 are large enough in diameter to extend into the kerfs 42.

A modification of what is shown in Figure 3 appears in Figure 4, which, like Figure 3, relates to station B. Instead of using knives 41 having a diameter such that they project 1¼" into the throat between the two rolls, it is possible to use two pairs of knives 46 each of which extends approximately 1" into the throat. Knives 46 do not touch, being separated by a space of 0.001". For practical purposes, this is sufficient to complete the slicing operation begun at station A. If block W is fairly easy to penetrate, the knife arrangement shown in Figure 4 can be used at station A, in which case station B can be omitted entirely.

The knives 46 shown in Figure 4 are separated by spacers 47 that are similar to spacers 43. There is one such spacer between the knives of each pair and similar spacers to the left and right of the pair of knives. Abutting the last mentioned spacers are collars 48 which are otherwise similar to collars 39 but which are beveled as at 49 to reproduce the half profiles of the knives 46. While not strictly necessary, this feature does make it possible to equalize the pressures as explained below. Collars 48 are positioned between sleeves 50 similar to sleeves 44 and held in place in similar fashion in the two rolls.

Beveling the collars more or less as shown makes for better operation of the machine and results in substantially equal treatment of the two side faces of each of the parts into which block W is being separated. In the case of the middle part; i.e., the one between the knives 46, beveling of the collars 49 has no substantial effect; however, in the case of each of the other parts, whenever a substantial portion of the inside face is densified as a result of coming into contact with the flat surface on one of the knives 46, the portion of the outside face in contact with the flat surface on one of the collars 48 is likewise densified. Where the tendency to densify is reduced, it is reduced equally on both faces, regardless of whether the contact is with a knife or with a collar. In this connection, it should be understood that Figure 4 shows the beveled portions in exaggerated fashion in the interests of clarity and that in practice there is little or no visible distortion of the product.

Figure 5:
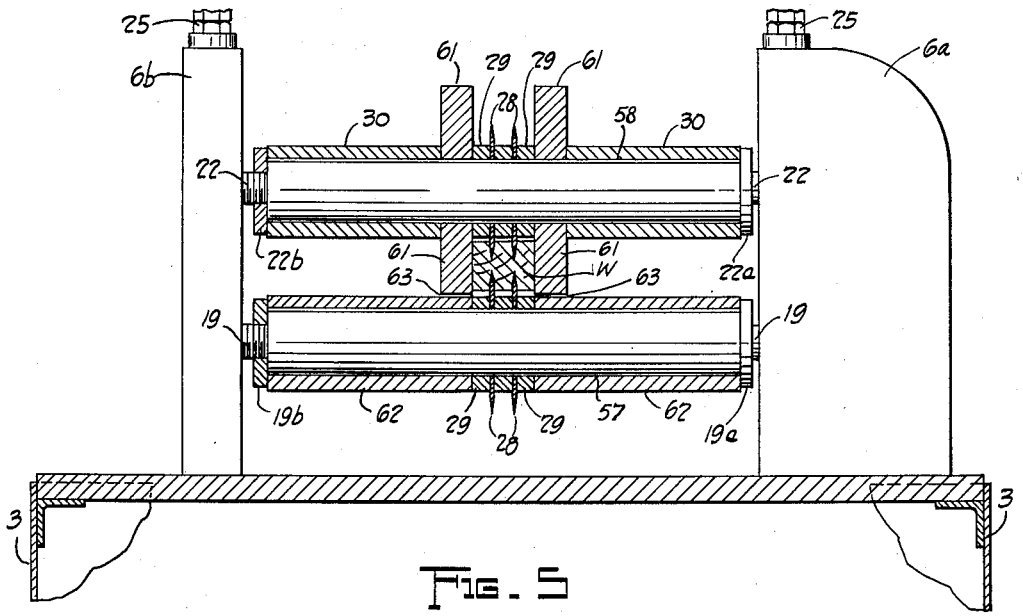
Figures 5 and 6 are views similar to those of Figures 2 and 3 illustrating an alternative form of the invention.
Figure 6:
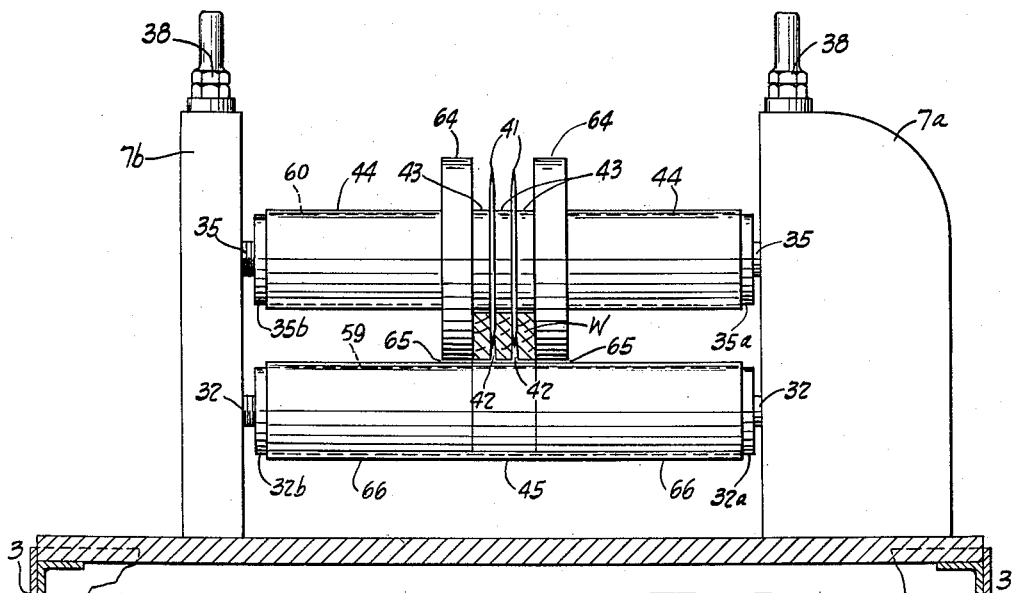

Referring now to Figures 5 and 6, which correspond to Figures 2 and 3 but deal with a different embodiment of the invention, it will be noted that Figure 5 shows a lower roll 57 and an upper roll 58. Respectively, these rolls correspond to rolls 18 and 21 of Figure 2. Similarly, Figure 6 shows a lower roll 59 and an upper roll 60 which correspond respectively to lower roll 31 and upper roll 34 in Figure 3. Although the rolls differ as explained below, shafts 19, 22, 32 and 35, knives 28 and 41, spacers 29, 43 and 45, and sleeves 30 and 44 are the same in Figures 5 and 6 as in Figures 2 and 3.

At station A, represented in Figure 5, there are collars only on upper roll 58. Such collars, designated 61, are of a diameter such that they, taken with rolls 57 and 58, form the throat through which block W is caused to pass; accordingly, no collars are needed on lower roll 57. Sleeves 62 on lower roll 57 are somewhat longer than sleeves 30 on upper roll 58, extending from flange 19a or nut 19b (as the case may be) into contact with annular spacers 29. If, as in the usual case, collars 61 and sleeves 62 rotate at different peripheral speeds, actual contact between them would be deleterious. Therefore, collars 61 do not engage sleeves 62 but are spaced from them by clearances 63 of the order of a few thousandths of an inch.

At station B, shown in Figure 6, two similarly formed collars 64 flank the assembly of knives and spacers defining the throat through which block W passes. Collars 64 are similar to collars 61 at station A and, like them, approach but do not engage the surface of the lower roll. Rather, clearances 65 of the order of a few thousandths of an inch intervene between collars 64 and sleeves 66. The reason is the same as before; namely, that contact would be deleterious in view of the substantial difference in the peripheral speeds.

Figures 7, 8:
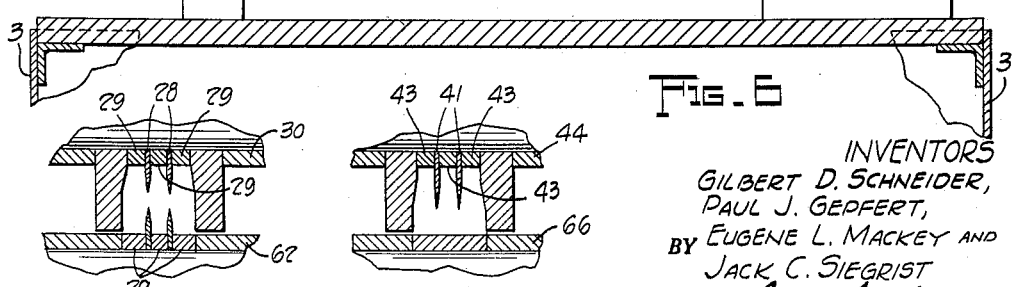
Figure 7 is a fragmentary view of a modification of what is shown in Figure 5.
Figure 8 is a fragmentary view of a modification of what is shown in Figure 6.

Figures 7 and 8 are fragmentary views of a modification of the embodiment of the invention shown in Figures 5 and 6. In general, the arrangement of shafts, sleeves, collars and spacers is the same; however, in Figure 7 the collars are beveled as shown so as to reflect the half-profiles of upper knives 28 and in Figure 8 the collars are beveled so as to reflect the different half-profiles of knives 41. As before, the purpose is to equalize pressures so far as possible. It is apparent that, if desired, the collars may be cut away at one station only rather than at both; for example, only at station B and not at all at station A.

Figures 9 and 10 represent still another embodiment of the invention, in this case one in which there is provision for enlarging the throat to accommodate variations in width of block W. It is apparent that in the embodiments of the invention so far described, the dimensions of the transverse cross section of block W cannot substantially exceed the dimensions of the throat. It may fall short of the throat dimensions without doing any harm to the machine, but if it measures substantially more in width than the width of the throat, jamming and other difficulties are likely to result. In order to obviate such difficulties and to permit the machine to accept blocks of random width, the element of flexibility is introduced as hereinafter explained into the embodiment of the invention shown in Figures 9 and 10.

Figure 9 shows the construction of the roll stand at station A; Figure 10, that at station B. At station A are a lower roll 71 and an upper roll 72; at station B, a lower roll 73 and an upper roll 74. Shafts 19, 22, 32 and 35 are similar to the correspondingly numbered shafts in the previously described embodiments of the invention, being provided, respectively, with flanges 19a, 22a, 32a and 35a and nuts 19b, 22b, 32b and 35b. Certain of the other components may be so constructed as to be interchangeable with corresponding components in the embodiments of the invention so far described.

At station A there is on lower shaft 19 a long sleeve 75; on upper shaft 22, a short sleeve 76. These sleeves bear against flanges 19a and 22a, respectively. At the opposite end of sleeve 76 a collar 77 is fixedly mounted on shaft 22, such collar being of a diameter such that its periphery approaches close to but fails to make contact with sleeve 75 on shaft 19. Between them is a clearance 78, shown in exaggerated fashion in Figure 9. Adjoining collar 77 is a first or upper set of spacers 80 and knives 81. In general, the arrangement of collar 77, spacers 80 and knives 81 is similar to that described in connection with corresponding parts 28, 29 and 61 of Figure 5. Collar 77 is beveled as indicated in somewhat exaggerated fashion at 79 to keep it from rubbing against the nearest spacer in the second or lower set of spacers 80 and knives 81, which is mounted on shaft 19.

In juxtaposition to the upper set of spacers 80 and knives 81 is an axially movable collar 82. The latter is preferably formed substantially as shown, being provided with a laterally extending sleeve-like portion 82a adapted to ride on a narrower but somewhat longer sleeve 83 that is rigidly positioned on the periphery of shaft 22. It will be noted that the edge of movable collar 82 is provided with a bevel 79 similar to the bevel 79 on fixed collar 77. The reason is much the same; namely, to preclude possible interference with that one of the three spacers of the lower set of spacers and knives which adjoins the collar.

Movable collar 82, being shorter than sleeve 83, has some freedom of movement in relation to it, being susceptible of being urged to the left as seen in Figure 9 in the event that the block W measures more in width than the nominal width of the throat between rolls 71 and 72 on one hand and collars 77 and 82 on the other. In order to keep it in contact with the near side of block W, collar 82 is backed by a series of stout coil springs 84 which intervene as shown between movable collar 82 and an annular spring abutment 85. Bolts 86, which serve as spring retainers, pass through openings in spring abutment 85 and thence through springs 84, their threaded end portions being screwed into tapped openings in movable collar 82. Spring abutment 85 is located in position by a short sleeve 87 which, in common with the various other parts that are in contact with the periphery of shaft 22, is held in place by nut 22b. As a result, whenever movable collar 82 moves to the left against or to the right in response to the forces exerted by springs 84, bolts 86 move with it.

On the lower roll 75, a long sleeve 88 intervenes between nut 19b and the lower set of spacers 80 and knives 81. Between the periphery of movable collar 82 and the periphery of sleeve 88 there is a substantial clearance, sufficient so that free movement of the former is not impeded. Thus movable collar 82 is free to slide to the left as seen in Figure 9 as the width of block W increases, increasing thereby the effective width of the throat. It is free to move in the opposite direction under the influence of springs 84 when the width of block W no longer exceeds the nominal width of the throat through which block W is made to pass.

At station B, the parts are arranged much as at station A. In place of knives 81 of relatively small diameter, knives 89 are of a diameter sufficiently great so that they approach each other at the center of the throat, escaping contact by perhaps 0.001". In order to equalize the pressures on the side faces of the several parts into which the block is being separated, the half-profiles of knives 89 are reflected as shown in cut-away portions 90 on collars 91 and 92. Except as regards the presence of cut-away portions 90, collars 91 and 92 are similar to collars 77 and 82. Thus at station B, as in station A, dimensions of block W may from time to time exceed the nominal dimensions of the throat within limits without doing harm to the machine, this by virtue of the fact that collar 92 is free to move axially of the shaft.

It is evident that in each of the several embodiments of the invention shown in Figures 2 and 3, Figures 5 and 6, and Figures 9 and 10, numerous changes may be made without departing from the spirit of the invention. The arrangement of knives need not necessarily be as shown in the drawings, nor need they necessarily be employed in pairs. In each case, the number of knives may be reduced to one or increased to three, four, five or more, depending on the number of pieces into which the lumber is to be severed. The number of stations may vary from a minimum of one to some larger number; for example, three, four, five or more, as desired. The size, shape, location and arrangement of the collars may be changed, if desired, to suit the needs of a given situation. Other changes of a like nature may be expected from those skilled in the art to which the invention pertains.

It is intended that the patent shall cover, by summarization in appended claims, all features of patentable novelty residing in the invention.

What is claimed is:

1. In a slicing machine, a roll stand comprising two end frames; two shafts extending between the end frames; one or more knives rigidly mounted on at least one of the shafts; collars flanking the knives; and, on the collars, means reproducing the half-profiles of the knives.

2. A slicing machine as in claim 1 in which the means reproducing the half-profiles of the knives take the form of cut-away portions.

3. A slicing machine as in claim 2 in which the cut-away portions extend radially toward the outer peripheries of the collars.

4. In a slicing machine, a roll stand comprising two spaced end frames; two paired rolls at least one of which is positively driven, said rolls extending between the two end frames; rotary guides which, together with the rolls themselves, form a work-confining throat through which the work passes on its way through the machine, said guides taking the form of collars on one of the two rolls that extend outwardly into proximity to the other of the two rolls; and, projecting into the throat so formed, one or more knife-edged elements for slicing the work.

5. A slicing machine according to claim 4 in which the collars closely approach but nevertheless are out of contact with said other roll.

6. A slicing machine according to claim 5 in which one of the collars is free to move axially of the roll of which it forms part.

References Cited in the file of this patent

UNITED STATES PATENTS

| | | |
|---|---|---|
| 499,424 | Haskell | June 13, 1893 |
| 559,396 | Meyer | May 5, 1896 |
| 1,691,102 | Witham | Nov. 13, 1928 |
| 1,881,020 | McFarland | Oct. 4, 1932 |
| 2,266,847 | Calpha | Dec. 23, 1941 |
| 2,468,595 | Elmendorf | Apr. 26, 1949 |
| 2,535,195 | Colucci | Dec. 26, 1950 |
| 2,717,012 | Schneider | Sept. 6, 1955 |